United States Patent [19]

Armor et al.

[11] 4,317,952

[45] Mar. 2, 1982

[54] LIQUID COOLED TERMINAL BOXES

[75] Inventors: Anthony F. Armor; James B. Archibald, both of Schenectady; David A. Noel, Rotterdam Junction, all of N.Y.

[73] Assignee: General Electric Company, Schenectady, N.Y.

[21] Appl. No.: 948,816

[22] Filed: Oct. 5, 1978

[51] Int. Cl.³ .............................................. H05K 7/20
[52] U.S. Cl. ........................ 174/15 BH; 174/35 CE; 361/385; 165/169; 310/54
[58] Field of Search .......... 174/15 R, 15 BH, 35 CE; 361/385, 382; 165/168, 169; 310/52, 54, 58, 59, 64, 65, 71; 200/289

[56] References Cited

U.S. PATENT DOCUMENTS

| | | | |
|---|---|---|---|
| 3,740,595 | 6/1973 | Heller | 310/52 |
| 3,808,489 | 4/1974 | Albright | 310/52 |
| 4,121,126 | 10/1978 | Armor | 310/59 |

*Primary Examiner*—Gerald P. Tolin
*Attorney, Agent, or Firm*—John F. Ahern; Ormand R. Austin

[57] ABSTRACT

Terminal boxes for large dynamoelectric machines provide a housing for high voltage terminal bushings which connect the dynamoelectric machine with a power grid. The stray flux from the terminal bushings induces eddy and circulating currents in the terminal box walls and consequent heating of the walls. To limit wall temperatures water is circulated through sealed flow channels fabricated to the terminal box walls and in series with the terminal bushings flow circuit. A preferred wall construction comprises an outer wall of stainless steel clad carbon steel and an inner wall of stainless steel.

15 Claims, 5 Drawing Figures

LIQUID COOLED TERMINAL BOXES

BACKGROUND OF THE INVENTION

This invention relates to large dynamoelectric machines of the type used in power plants; and, in particular, this invention relates to terminal boxes which are included as part of the dynamoelectric machine structure.

The terminal box of a large dynamoelectric machine provides a housing for the high voltage bushings which conduct electrical current out of the dynamoelectric machine. Stray magnetic flux from the phase leads and neutral leads, as they are carried through the terminal box by the high voltage bushings, will impinge upon the walls of the terminal box and cause circulating currents. This can lead to heating of the terminal box walls in some locations depending upon the orientation of the walls and their location with respect to the bushings.

The use of flux shields in various portions of a dynamoelectric machine is well known. These generally consist of sheets of conductive material placed between the source of stray flux and the member which is to be shielded. Circulating currents are set up in the flux shield itself which then tend to repel stray flux from entering the shielded member. Large dynamoelectric machines are typically cooled by hydrogen gas and further this gas cooling may be extended to the terminal box vis-a-vis the physical connection of the terminal box to the dynamoelectric machine. Moreover, the terminal bushings may be directly or indirectly cooled by means of the hydrogen gas (U.S. Pat. No. 2,742,582; Bahn et al). In U.S. Pat. No. 4,029,978 to Jager et al, liquid cooling of the terminal bushings is demonstrated.

In U.S. Pat. No. 3,808,489 to Albright et al, the terminal box for the high voltage bushings of a dynamoelectric machine is provided with special flux shields to reduce heating of the terminal box walls caused by circulating currents due to stray flux from the high voltage bushings. The flux shield and terminal box walls are then cooled by gas flowing through special passages between them. The shield is spaced from the walls and means are provided for inducing a flow of cooling gas to cool both the walls and the flux shield. The shield is arranged to create the greatest cooling at the location where heating is most likely to occur.

Finally, U.S. Pat. No. 3,435,262 to Bennett et al discloses core end flux shields for use in a dynamoelectric machine wherein the core end flux shields are liquid cooled.

OBJECTS OF THE INVENTION

The foregoing schemes may be limited in their range of application to dynamoelectric machines. Thus the use of hydrogen gas for cooling a terminal box may be limited in rating for a six bushing box. This rating may be enhanced by the use of multiple flux shields and intricate gas cooling schemes in order to provide satisfactory cooling at higher ratings. It has therefore become a primary object of the invention to provide a terminal box for a dynamoelectric machine which may be capable of satisfactory operation under very high electrical loadings.

It is another object of the invention to minimize the number of flux shields.

It is still a further object of this invention to provide a sealed cooling system for a terminal box.

It is a further object of this invention to provide a cost effective terminal box for higher rated machines.

Finally, it is an object of this invention to enhance the cooling mechanism in a terminal box without increasing the size of the terminal box.

SUMMARY OF THE INVENTION

The invention to be described is best identified as a liquid cooled terminal box. The perimeter of the box may be rectangular and defined by four vertical stainless steel clad carbon steel walls. Sections of stainless steel sheet are disposed adjacent to the clad side of the carbon steel walls and stainless furring strips are used to attach each sheet to its respective terminal box wall in order to define individual fluid channels between the sheet and the wall. The fluid channels thus defined are around the perimeter of the box.

The uppermost channel becomes a header for connection to the terminal bushings in order to supply liquid coolant to each terminal bushing. A collection pipe is disposed in the bottom of the box to receive the liquid coolant from the terminal bushings. The liquid is then reintroduced into the lower wall channels of the box through a common manifold and then withdrawn from the box. Thus the liquid is circulated through the box in a sealed series configuration by means of the upper channel, the bushings and the lower channels.

BRIEF DESCRIPTION OF THE DRAWINGS

The subject matter which is regarded as the invention is particularly pointed out and distinctly claimed in the concluding portion of the specification. The invention, however, both as to organization and method of practice together with further objects and advantages thereof may be best understood by reference to the following description taken in connection with the accompanying drawings in which:

DETAILED DESCRIPTION OF THE INVENTION

Figure 1:
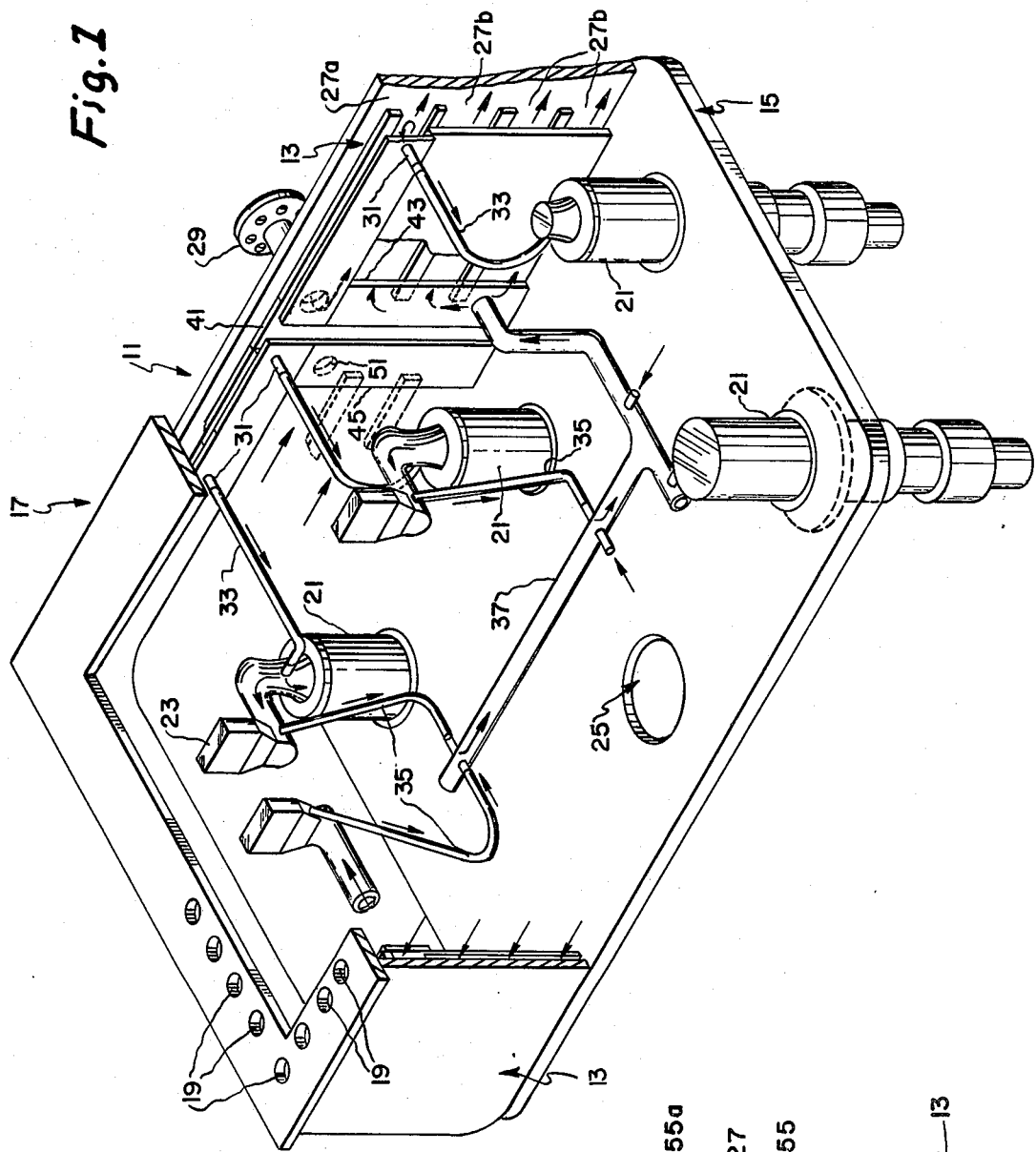
FIG. 1 is an isometric view of a terminal box according to the present invention with portions of the terminal box wall cut away and in section to conveniently and clearly show the construction of the terminal box.

FIG. 1 is an isometric view of a terminal box 11 for a large dynamoelectric machine (not shown). One example of the complete construction of the terminal box to the dynamoelectric machine is shown in U.S. Pat. No. 2,742,582 to Bahn et al. The terminal box is comprised of vertical walls 13, a base plate 15 and a bolting flange 17 at the top of the vertical walls. Alternatively, without departing from the scope of the invention, the terminal box could have cylindrical walls as is known for six and three bushing machines. Holes 19 are fabricated in the bolting flange for the purpose of attaching the terminal box to the underside of a dynamoelectric machine. The purpose of the terminal box is to provide a support and enclosure for the terminal bushings 21 which conduct electrical current out of the dynamoelectric machine into a power grid. In a three phase dynamoelectric machine there will ordinarily be six terminal bushings, although the number of bushings is variable and dependent on the electrical circuit of the machine. Each bushing includes a connector plate 23 for making electrical connection with the outlet leads from the machine. Each bushing extends through the base plate 15 of the terminal box vis-a-vis openings 25 in order to lead electrical current out of the machine into the power grid. The high voltage bushings emit flux which then impinge on the terminal box walls resulting in eddy and circulating currents which, in turn, cause heating of the box walls.

From the foregoing, it should be apparent that one objective of the invention is to provide for wall cooling. It is further intended to enhance wall cooling beyond the capability of the prior art hydrogen cooled terminal boxes. It is well known that the heat absorption and heat transfer coefficients of water are vastly superior to hydrogen gas for a given flow velocity. This means that small quantities of water at a much reduced velocity can still effect greatly enhanced cooling capability. However, this observation and invention is not limited to water cooling and therefore may be extended to any type of liquid cooling of the terminal box.

Figure 2:
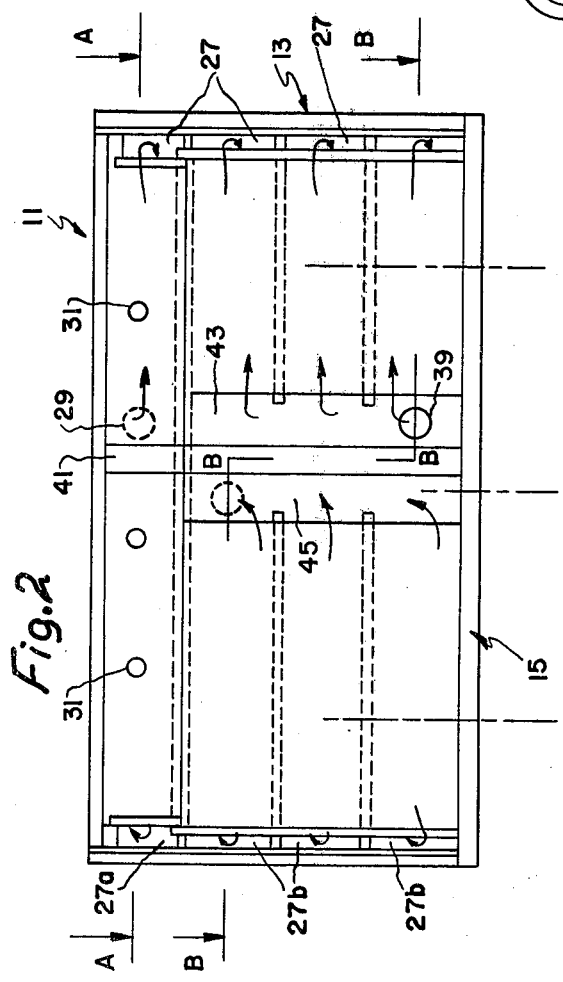
FIG. 2 is an elevation view of the terminal box taken immediately adjacent the wall containing the inlet/outlet connections and looking from the inside out.

FIG. 2 in combination with FIG. 1 plainly show several aspects of the inventive cooling scheme. For example, the vertical walls serve as channels 27 or ducts for the cooling liquid. According to a preferred embodiment of the invention, the channels are divided into tiers so that an upper channel 27A provides an inlet header for the coolant liquid into the box walls and a distribution network for coolant liquid into the bushings 21. The box inlet opening 29 is connected to a source of water (not shown) but which is available at the dynamoelectric machine in conjunction with water cooling of the stator bars.

Figure 3:
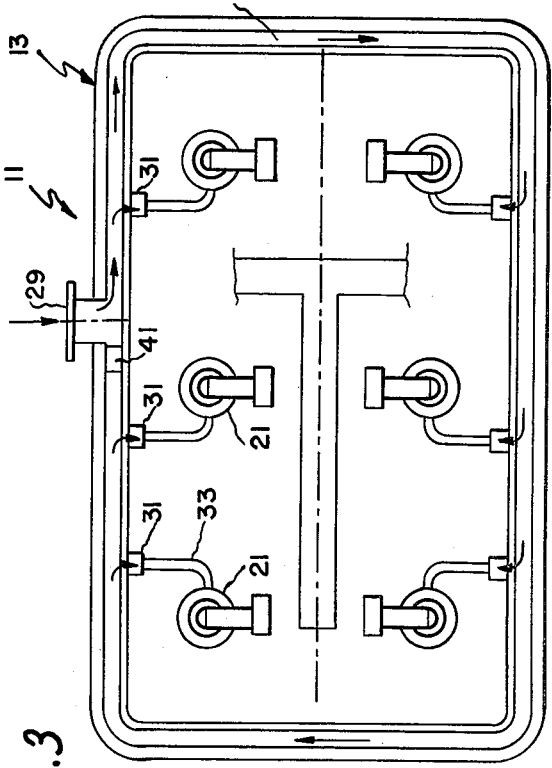
FIG. 3 is a plan view of the terminal box taken at A—A.

The preferred embodiment of the invention utilizes deionized water as the liquid coolant. The deionized water is chosen because of its lower electrical conductivity and because in combination with the stainless steel channel walls there is a great resistance to corrosion. If desired other liquids may be used in combination with other wall surfaces without departing from the basic scope of this invention. As shown in FIG. 3, the liquid coolant is circulated around the perimeter wall 13 for the purpose of cooling the wall. Moreover, the wall acts as a distribution conduit for distributing coolant fluid to the bushings at wall outlets 31 in the upper tier channel. In the present example of a preferred embodiment there are six outlet openings, one for each terminal bushing.

The water coolant from each wall outlet is input into its respective terminal bushing through hose connections 33. The water coolant may be circulated through the terminal bushing in any known manner practiced in the art or as shown in U.S. Pat. No. 2,742,582 to Bahn et al for gas cooled bushings, the modification for water cooling being something which would be known to one of ordinary skill in the art. The water coolant is retrieved from each bushing through hoses 35 which connect the water outlet of each bushing with a central collection pipe 37.

Figure 4:
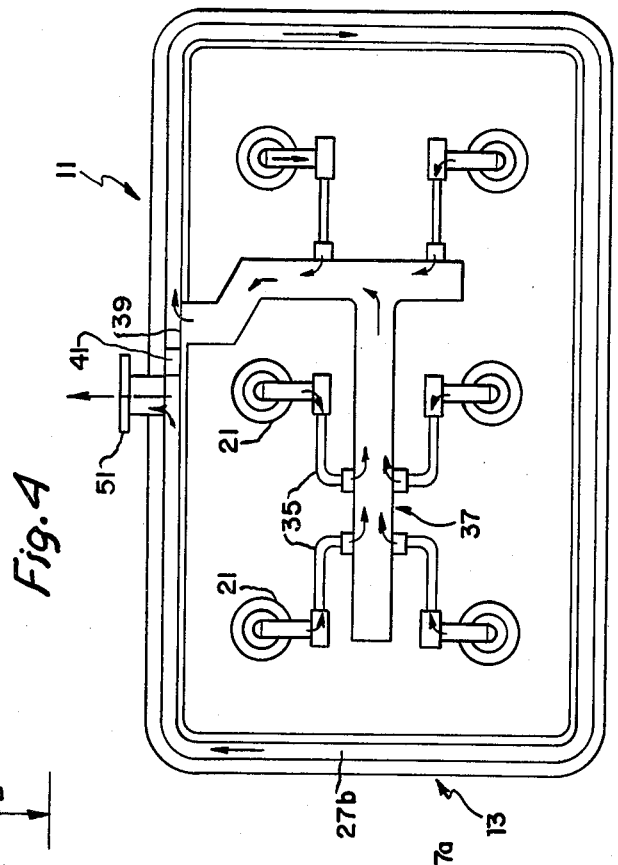
FIG. 4 is a plan view of the terminal box taken at B—B.

The central collection pipe 37 conducts the coolant liquid from the bushings back into the wall at wall openings or channel inlet 39 shown in FIG. 4. As has been mentioned, the walls are really water conducting channels as well as a water cooled wall. The construction of the terminal box wall is such that there is a vertical flow divider or dam 41 which ensures that the liquid coolant travels around the box in one direction. Thus water in the upper channel 27A makes one clockwise pass about the box and then exits to the bushings. Likewise water received into wall opening 39 is also sent clockwise about the box in lower tier channels 27B. Since there are three lower tier channels in the preferred embodiment, provision is made for parallel distribution of water to each channel via a vertical channel distribution header 43 formed in combination with the flow divider 41. Again, the liquid coolant circulates through the walls 27B in a clockwise direction in order to cool the box walls. Finally, the water is collected out of the terminal box walls via a vertical channel fluid collection header 45 and a terminal box water outlet 51.

Figure 5:
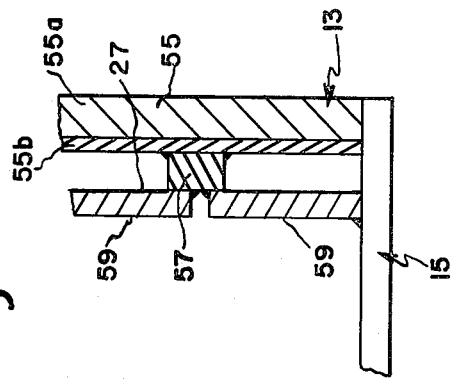
FIG. 5 is a cross section of the terminal box wall and base plate construction.

FIG. 5 is a cross section of a wall and base plate. It is desirable for reasons that will be explained that the entire channel 27 be made of a non-magnetic material which is resistant to corrosion, will reduce circulating currents and will obviate the possibility of releasing magnetic particles into the water system. Non-magnetic stainless steel is a preferred material because of its superior possession of the aforementioned properties and because it is weldable. In the preferred construction shown in FIG. 5, a first wall 55 is a stainless steel clad carbon steel including a carbon steel portion 55A and a stainless steel clad portion 55B. Stainless steel furring strips 57 are welded to the first wall clad side and stainless steel sheets 59 are then welded to the furring strips to form water tight channels having interior surfaces of stainless steel. It is further preferred that at least one box wall be constructed with a carbon steel base in order to absorb the stray flux from the terminals. Hence, it is an important aspect of this invention to include stainless steel clad carbon steel wall as part of the preferred construction.

The operation of the invention is as follows. The invention provides an enclosure and support for terminal bushings from a dynamoelectric machine. The bushings are high voltage terminals for conducting current from the dynamoelectric machine to a power grid. Stray flux from the terminal bushing cause the walls of the terminal box to heat. The present invention proposes cooling the terminal box walls and the terminals themselves with a liquid coolant which is circulated through one wall portion, through the terminals and then through a second wall portion.

Liquid coolant, preferably water is input through wall inlet 29 into an upper channel 27A formed in wall 13. The water circulates clockwise in the upper channel while being diverted into bushings 21 from wall outlets 31 via lines 33. The liquid coolant circulates through the bushings and is input back into a vertical inlet header 43 through wall opening 39. This header distributes the water to lower tier channels 27B to again be run clockwise about the terminal box wall. The flow of water is terminated within the box at outlet header 45 and system outlet 51.

Noting the attachment of the stainles steel sheet material 59 to the base plate 15 in FIG. 5 it is pointed out that additional heat transfer benefit from the base plate is achieved by direct contact with the cooling liquid. Moreover, it is additionally pointed out that the stainless steel sheeting may be disposed outside the box to form the water channels if so desired so long as the stainless steel clad portion of the terminal box wall is used to form an inside portion of the water channel.

While there has been shown what is considered to be the preferred embodiment of the present invention, other modifications may occur to those skilled in the art, e.g., the terminal box may be non-rectangular in shape. It is intended to cover in the appended claims all such modifications as fall within the true spirit and scope of the invention.

What is claimed is:

1. A terminal box for a multi-phase dynamoelectric machine having high voltage bushings passing there through, said terminal box comprising:
   a base plate supporting said terminal bushings;
   a first terminal box wall defining an enclosure about the high voltage bushings;
   a second terminal box wall spaced from but adjacent to said first terminal box wall; said first and second walls defining at least one sealed flow channel about the terminal box;
   a box inlet opening and a box outlet opening connected to said box whereby liquid coolant may be circulated through the walls of the box;
   at least one channel outlet fluidly connecting the channel with the terminal bushings;
   at least one channel inlet fluidly connecting the terminal bushings with the channel whereby liquid coolant may be withdrawn from the channel into the terminal bushings and returned from the terminal bushings into the channel; and,
   a plurality of horizontal furring strips dividing said channel into at least one upper channel and at least one lower channel extending around the perimeter of the terminal box.

2. The terminal box recited in claim 1 further including a vertical furring strip providing a dam between the box inlet opening and the box outlet opening.

3. The terminal box recited in claim 2 wherein the liquid coolant flow path from the box inlet opening to the box outlet opening comprises:
   the box inlet into the upper channel;
   the channel outlet in the upper channel to the terminal bushings;
   the terminal bushings to the channel inlet in the lower channel; and,
   the lower channel to the box outlet opening.

4. The terminal box recited in claim 2 further comprising:
   at least two parallel lower channels;
   a fluid distribution header on one side of the dam connecting the lower channel inlet with the lower channel;
   a fluid collection header on the other side of the dam connecting the lower channel with the terminal box outlet opening.

5. The terminal box recited in claim 1 wherein the terminal box walls are supported on said base plate and said lower channel is in direct contact with said base plate for direct liquid cooling of the base plate.

6. The terminal box recited in claim 1 wherein the channel is defined by a non-magnetic, corrosion resistant, weldable steel.

7. The terminal box recited in claim 1 wherein the channel material is non-magnetic stainless steel.

8. A terminal box for a multi-phase dynamoelectric machine having high volage bushings passing therethrough, said terminal box comprising:
   a base plate supporting said terminal bushings;
   first and second terminal box walls defining a perimeter enclosure about the terminal bushings; said terminal box walls being substantially parallel to and closely adjacent one another whereby a channel is formed between the walls and around the perimeter of the terminal box;
   a box inlet opening and a box outlet opening whereby liquid coolant may be circulated to and from the terminal box walls; and,
   means interconnecting the terminal bushings and the box wall channel whereby liquid coolant may be passed to and from the box walls and terminal bushings for cooling the box walls and terminal bushings in combination with one another.

9. A terminal box for a multi-phase dynamoelectric machine having high voltage bushings passing therethrough said terminal box comprising:
   a base plate supporting said high voltage bushings;
   inner and outer terminal box walls defining an enclosure about the terminal bushings;
   horizontal spacers separating the inner and outer walls defining at least two parallel flow wall channels;
   means for introducing liquid coolant into one of said parallel flow channels;
   means for removing liquid coolant from the other of said parallel flow channels; and,
   said parallel flow channels being fluidly interconnected through said terminal bushings.

10. A terminal box for a multi-phase dynamoelectric machine having high voltage bushings passing therethrough, said terminal box comprising:
    a base plate receiving said terminal bushings;
    inner and outer terminal box walls defining an enclosure about the terminal bushings;
    horizontal spacers separating the inner and outer walls defining at least one upper and one lower parallel flow wall channel;
    a box inlet connected to said upper channel;
    a plurality of outlets spaced around the perimeter of the upper channel and connected to the terminal bushings;
    a collection pipe adjacent the terminal bushings connecting said bushings with the lower channel; and,
    a box outlet in the lower channel.

11. The terminal box recited in claim 10 further including:
    a vertical spacer between said inner and outer walls defining a dam between the box inlet opening and the box outlet opening.

12. A terminal box for a multi-phase dynamoelectric machine having high voltage bushings passing therethrough, said terminal box comprising:
    a first wall including a carbon steel base and a stainless steel clad surface;
    a second wall including a plurality of stainless steel sheets;
    furring strips disposed between said first and second walls, said furring strips, stainless steel sheets and stainless steel surface defining a liquid carrying channel.

13. A terminal box for a multi-phase dynamoelectric machine including high voltage bushings, said terminal box comprising:
    a base plate supporting said high voltage bushings;
    a first wall defining a perimeter about the terminal bushings;
    a second wall substantially parallel to said first wall;
    furring strips between said first and second walls to define upper and lower channels;

a box inlet for admitting liquid coolant to one of said channels;

a box outlet for removing liquid coolant from the other of said channels; and, outlet and inlet means for interconnecting the terminal bushings with the channels.

14. The terminal box recited in claim 13 wherein the box inlet is connected to the upper channel and the box outlet is connected to the lower channel;

said outlet means including a plurality of openings in the upper channel, each opening connected to a respective terminal bushing;

said inlet means including a collection pipe within the terminal box connected to each terminal bushing and terminating at the lower channel wall.

15. The terminal box recited in claim 13 wherein the first wall is a carbon steel wall having a stainless steel clad surface and the second wall is entirely stainless steel, said first and second walls arranged to form a stainless steel channel.

* * * * *